Aug. 9, 1932.          H. D. RICE          1,870,870
FOOTWEAR AND PROCESS OF MAKING THE SAME
Filed April 13, 1931
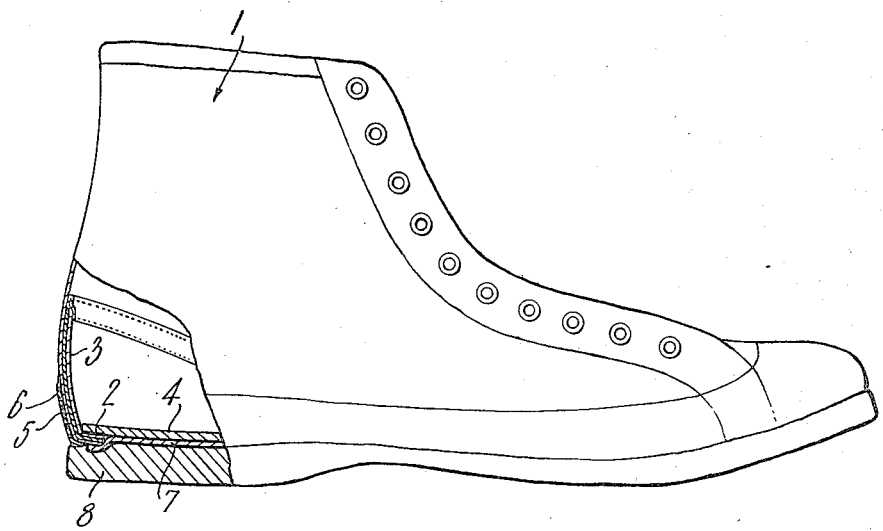
INVENTOR
*HAROLD D. RICE*
BY
*Walter L. Piper*
ATTORNEY Patented Aug. 9, 1932

1,870,870

UNITED STATES PATENT OFFICE

HAROLD D. RICE, OF BRISTOL, RHODE ISLAND, ASSIGNOR TO THE GOODYEAR INDIA RUBBER GLOVE MANUFACTURING COMPANY, OF NAUGATUCK, CONNECTICUT, A CORPORATION OF CONNECTICUT

FOOTWEAR AND PROCESS OF MAKING THE SAME

Application filed April 13, 1931. Serial No. 529,825.

This invention relates to a new process for the manufacture of footwear, especially tennis footwear, and the article thereby produced.

It has been customary in the manufacture of tennis footwear to apply naphtha cement, commonly known as "top or edging cement," to the lower inner margin of the canvas upper and to allow such cement to dry so as to form a tacky surface. Similar cement is applied to the bottom of the insole and allowed to dry. The insole is placed on a last, the cemented portion of the canvas upper is placed against the cemented portion of the insole and the upper drawn down firmly over the last to remove wrinkles therefrom and cause the upper and insole to adhere together. The next step in the manufacture of tennis footwear is to apply a coat of marking cement around the lower side portion of the canvas upper and at the same time to apply cement over the lower part of the shoe consisting of the bottom edge of the upper and the bottom of the insole. This marking cement is allowed to dry and a second or several further coats of cement may be similarly applied, if desired. A rubber upper strip, commonly known as a foxing, is then applied to the lower side portion of the upper, the marking cement serving to hold the foxing to the upper. If desired, as is usually the case in the better grades of footwear, a filling sole is cemented to the bottom of the insole. An outsole is then cemented to the bottom of a shoe, and the shoe finished in the usual manner.

This method of building canvas footwear is open to certain serious objections. The top and insole cements as applied contain approximately 30-35 per cent rubber compound and 65-70 per cent solvent. The common solvent employed today is the average grade of naphtha, having a Baumé ranging from 68° to 72°. In making tennis footwear the uncured strength and adhesive properties of this top and insole cement are of vital importance, in that they hold the insole and top together while the shoe is in the various stages of assembling. In lasting a canvas upper to an insole the upper is placed under considerable tension, in order to pull the fabric over onto the insole, giving a firmly and tightly lasted canvas upper. In fact, it is common practice today to use what is known as a bed laster, in which the canvas upper is pulled over onto the insole with claws which are operated with considerable pressure. The marking cements in common use consist of approximately 25 per cent rubber compound and 75 per cent solvent, which usually is naphtha similar to that used in the top cement. When the marking cement is applied, the solvent penetrates through the fabric of the upper and comes into contact with the top cement which was employed to unite the insole and upper, thereby frequently causing the separation of the insole and upper, which necessitates the re-lasting of the shoe. This re-lasting operation must be done by hand and is accordingly an expensive operation, with danger of soiling parts, and is usually a poorly executed operation. In addition, after the toes and heels are skived and the shoes open up, there is considerable danger of the marking cement seeping through to the inside of the shoe and soiling the inside parts. Furthermore, when the shoe opens up and is not put back in place properly the top cement is liable to show on the inside of the shoe, which naturally detracts from the appearance.

It is the object of this invention to provide a new process whereby the action of solvent from the marking cement upon the top cement which unites the upper and insole is prevented. It is a further object of my invention to provide a new process for building tennis shoes which will produce tennis footwear in which the canvas tops present a far more uniform appearance and more closely resemble the cut of the last.

In carrying out my invention, a coat of latex or preferably of compounded latex is applied to the lower inner margin of the canvas upper. This coat of latex may be dried at normal temperatures or at elevated temperatures, such as 160-200° F., or the solid constituents thereof may be caused to deposit by coagulation or any other convenient and suitable manner. It is also advisable to apply a similar type of latex compound to the insole in that it is found that the adhesion of the top to the insole is far greater if a latex composition is also applied to the insole. However, if desired, ordinary insole cement may be applied to the insole. When the latex composition on the lower inner margin of the canvas upper and the latex composition or rubber cement on the insole are dried, the upper is lasted to the insole in the usual manner. After the lasting operation, the article is ready for the marking operation. Marking cement is then applied over the lower part of the shoe consisting of the bottom edge of the upper and the bottom of the insole in the usual manner and foxing is then applied to the lower portion of the upper over the marking cement. The filling sole, if one is used, and outsole are applied to the bottom of the shoe in the usual manner. It will be seen that when the marking cement is applied to the lower side portion of the upper, there is a film of the rubber deposit of a latex composition on the adjacent inner portion of the upper. The solvent from ordinary rubber cement will not dissolve or react with a rubber film deposited from latex composition as it will with a film of dried rubber cement. Therefore, when the solvent from the marking cement penetrates the lower portion of the canvas upper, it will contact on the inner surface thereof a film of rubber deposited from latex uniting the upper and insole and hence will not dissolve or react with such film and thus cause a separation of the upper and insole as would happen in the ordinary practice of uniting the upper and insole with naphtha cement. Instead of applying naphtha marking cement over the lower part of the shoe consisting of the bottom edge of the upper and the bottom of the insole in the usual manner, a layer of the solid constituents of a latex composition may be deposited on the lower part of the shoe and if desired naphtha cement applied over such layer, and the foxing affixed either to the deposit of the solid constituents of the latex composition or to the rubber cement over such deposit depending on whether the rubber cement is applied over the latex deposit, as disclosed in my copending application No. 295,357 filed July 25, 1928, now Patent No. 1,800,405, dated April 14, 1931. Instead of applying naphtha marking cement on the bottom edge of the upper, and affixing a foxing to the shoe by means of such cement, a foxing may be formed in situ on the bottom edge of the upper by depositing directly thereon the solid constituents of an aqueous dispersion of rubber as disclosed in my copending application Serial No. 295,358 filed July 25, 1928, now Patent No. 1,800,406, dated April 14, 1931. The assembled article may then be vulcanized in any of the suitable well known methods of vulcanization of such articles.

The accompanying drawing shows an article of footwear made by the preferred process of this invention.

The figure shows an elevation partly cut away of a canvas shoe embodying this invention.

The article of footwear 1 is shown with a film 2 of dried compounded latex uniting the top 3 and insole 4, and a film 5 of dried marking cement on the lower side portion of the upper uniting the foxing 6 to the said lower portion of the upper. A filling sole is shown cemented to the insole 4 and an outsole 8 cemented to the filling sole 7.

I prefer to use a latex composition for the top containing approximately 40% total solids and a latex composition for the insole with slightly less total solids, the latices for the top and insole being thickened to the viscosity desired depending upon whether they are to be applied by hand or by machine. The compounded latex that I prefer consists of, by weight:

| | |
|---|---|
| Rubber (170 parts of latex at 58.8% solids) | 100 |
| Sulphur | 4 |
| Rosin soap | 20 |
| Paraffin oil | 2.5 |
| 28% ammonium hydroxide | 3.5 |
| Condensation product of heptaldehyde and aniline | 1.00 |
| Ammonium alginate | .33 |
| Water | 102 |

To this composition a sufficient amount of water may be added to give the total solid content desired for a top cement or insole cement, as described above. The latex used in the above composition is made from normal latex by creaming with an agent such as alginate or Irish moss in a manner well known in the art and which creaming operation reduces the amount of water soluble material present and greatly improves the tackiness of the latex. The sulphur is a curing agent and is used in conjunction with the condensation product of heptaldehyde and aniline preferably added in the form of an emulsion, which serves as an accelerator. The paraffine oil which serves as a softening agent is added in the form of an emulsion together with the rosin soap and ammonium hydroxide. The ammonium alginate is used as a thickening agent to control the viscosity, as described above. Other forms of latex, such as normal latex, latex butter, vulcanized latex, or artificial dispersions of rubber, may be used in my process. The term "aqueous dispersion of rubber" used in the claims is intended to cover compositions made from the various kinds of latex or other water dispersions of rubber either natural or artificial. Other well known accelerators may be used instead of the one shown as may also other softening and thickening agents.

While specific embodiments of the invention have been described, it is obvious that numerous modifications may be made therein and it is not desired to limit the invention otherwise than as set forth in the appended claims.

Having thus described my invention, what I claim and desire to protect by Letters Patent is:

1. In the manufacture of footwear, the steps of applying a latex composition to the lower inner margin of an upper, applying rubber cement to an insole, drying said latex composition and said cement, and uniting the upper and the insole by means of said latex composition and said cement.

2. In the manufacture of footwear, the steps of applying an aqueous dispersion of rubber to the lower inner margin of an upper, applying an aqueous dispersion of rubber to an insole, causing the solid constituents of said dispersions to deposit thereon, uniting said upper and said insole by means of said deposit, applying a foxing to the lower side portion of said upper, applying an outsole to said upper and insole, and vulcanizing the rubber portions of said article.

3. In the manufacture of footwear, the steps of applying an aqueous dispersion of rubber to the lower inner margin of an upper, causing the solid constituents of said dispersion to deposit thereon, applying rubber cement to an insole, drying said cement, uniting the upper and the insole by means of said deposit and said cement, and applying a foxing to the lower side portion of said upper.

4. A vulcanized article of footwear comprising an upper, an insole, a layer of the solids deposit of an aqueous dispersion of rubber between said upper and said insole, a foxing on the lower side portion of said upper, a layer of cement uniting said foxing to said lower side portion of said upper, and an outsole affixed to said insole.

5. A vulcanized article of footwear comprising an upper, an insole, a layer of the solids deposit of an aqueous dispersion of rubber between said upper and said insole, a foxing on the lower side portion of said upper, a layer of the solids deposit of an aqueous dispersion of rubber between said foxing and said lower side portion of said upper, and an outsole affixed to said insole.

6. A vulcanized article of footwear having an upper, an insole, a layer of the solids deposit of an aqueous dispersion of rubber between said upper and said insole, a foxing affixed to the lower side portion of said upper, and an outsole affixed to said insole.

7. An article of footwear comprising an upper, an insole, a layer of the solids deposit of a latex composition and a layer of rubber cement uniting said upper and said insole, and a foxing affixed to the lower side portion of said upper.

8. A vulcanized article of footwear having an upper, an insole, a layer of the solids deposit of an aqueous dispersion of rubber between said upper and said insole, and an outsole affixed to said insole.

Signed at Bristol, county of Bristol, State of Rhode Island, this 11th day of April, 1931.

HAROLD D. RICE.